(12) United States Patent
Frank et al.

(10) Patent No.: US 9,776,104 B2
(45) Date of Patent: Oct. 3, 2017

(54) PROCESS AND APPARATUS FOR FORCED CIRCULATION EVAPORATIVE CRYSTALLIZATION WITH LARGE DEPOSIT INVENTORY

(71) Applicant: DOW GLOBAL TECHNOLOGIES LLC, Midland, MI (US)

(72) Inventors: Timothy C. Frank, Midland, MI (US); J. W. Moore, Lake Jackson, TX (US); Paul A. Larsen, Midland, MI (US); Pramod D. Patil, Lake Jackson, TX (US); Robert M. Whittingslow, Angleton, TX (US); Paul A. Gillis, Lake Jackson, TN (US)

(73) Assignee: Dow Global Technologies LLC, Midland, MI (US)

( * ) Notice: Subject to any disclaimer, the term of this patent is extended or adjusted under 35 U.S.C. 154(b) by 601 days.

(21) Appl. No.: 14/364,601

(22) PCT Filed: Dec. 14, 2012

(86) PCT No.: PCT/US2012/069761
§ 371 (c)(1),
(2) Date: Jun. 11, 2014

(87) PCT Pub. No.: WO2013/096122
PCT Pub. Date: Jun. 27, 2013

(65) Prior Publication Data
US 2014/0338843 A1  Nov. 20, 2014

Related U.S. Application Data

(60) Provisional application No. 61/578,986, filed on Dec. 22, 2011.

(51) Int. Cl.
*B01D 9/00* (2006.01)
*B01D 1/24* (2006.01)
*B01D 1/00* (2006.01)

(52) U.S. Cl.
CPC ............... *B01D 9/00* (2013.01); *B01D 1/007* (2013.01); *B01D 1/24* (2013.01); *B01D 9/0031* (2013.01)

(58) Field of Classification Search
CPC . B01D 1/007; B01D 1/24; B01D 9/00; B01D 9/0031
(Continued)

(56) References Cited

U.S. PATENT DOCUMENTS 1,972,730 A * 9/1934 Connell ............... B01D 9/0022
159/45
2,384,747 A * 9/1945 Hughes ................ B01D 9/0031
159/26.1
(Continued)

FOREIGN PATENT DOCUMENTS

CN  1431923  7/2003
EP  2319598  5/2011
(Continued)

OTHER PUBLICATIONS

Chinese Patent Application No. 201280062804.3, Notification of the First Office Action, mailed May 25, 2015.
(Continued)

*Primary Examiner* — Jonathan Miller
(74) *Attorney, Agent, or Firm* — McDonnell Boehen Hulbert & Berghoff LLP

(57) ABSTRACT

Disclosed are processes and apparatuses for producing a crystalline product. The processes and apparatuses may extend the operational time of an evaporative crystallizer by providing an internal volume or large deposit inventory for
(Continued)

fouling deposits to reside without impacting the unit operation.

11 Claims, 5 Drawing Sheets

(58) Field of Classification Search
USPC .......................................................... 159/45
See application file for complete search history.

(56) References Cited

U.S. PATENT DOCUMENTS

| | | | |
|---|---|---|---|
| 2,567,968 A | | 9/1951 | Saeman |
| 2,602,023 A | * | 7/1952 | Simms ................. B01D 9/0022 |
| | | | 159/45 |
| 2,631,926 A | | 3/1953 | Eckstrom |
| 3,530,924 A | * | 9/1970 | Domning ............. B01D 9/0022 |
| | | | 159/45 |
| 5,431,779 A | * | 7/1995 | Kawata .................... C01D 3/06 |
| | | | 159/44 |
| 6,001,246 A | * | 12/1999 | Suenkonis ............... B01D 1/12 |
| | | | 159/24.3 |
| 6,334,878 B1 | * | 1/2002 | Miyahara ............. B01D 9/0004 |
| | | | 23/295 R |
| 6,335,045 B1 | * | 1/2002 | Peters ...................... A23C 1/12 |
| | | | 159/45 |
| 6,444,181 B1 | | 9/2002 | Setzer et al. |
| 7,056,356 B2 | | 6/2006 | Allen et al. |
| 2008/0281130 A1 | | 11/2008 | Blaschke et al. |

FOREIGN PATENT DOCUMENTS

| | | |
|---|---|---|
| WO | WO93/19826 | 10/1993 |
| WO | WO9301986 | 10/1993 |

OTHER PUBLICATIONS

H.J.M. Kramer et al., "Modeling of Industrial Crystallizers for Control and Design Purposes," Powder Technology, vol. 108, pp. 185-191 (2000).

PCT/US2012/069761, International Search Report and Written Opinion, mailed Apr. 23, 2013.

Handbook of Industrial Crystallization, edited by Allan S. Myerson (Butterworth-Heinemann, Boston), pp. 115-140, 201-230 (2002).

* cited by examiner

PROCESS AND APPARATUS FOR FORCED CIRCULATION EVAPORATIVE CRYSTALLIZATION WITH LARGE DEPOSIT INVENTORY

CROSS REFERENCE TO RELATED APPLICATION

This application claims priority to International Patent Application No. PCT/US2012/69761, filed Dec. 14, 2012, which claims priority to U.S. Provisional Application No. 61/578,986, filed Dec. 22, 2011, all of which are hereby incorporated herein by reference in their entireties.

FIELD

This invention relates to processes and apparatuses for forced circulation evaporative crystallization. In particular, this invention relates to processes and apparatuses for prolonging the operational time of an evaporative crystallizer by reducing build up due to fouling deposits.

BACKGROUND

Evaporative crystallizers are used to produce valuable crystalline products, such as tetrasodium ethylenediaminetetraacetic acid ("Na4EDTA") and disodium EDTA. However, the operation of evaporative crystallizers is often limited in length of reliable operation due to the build-up of fouling deposits inside the evaporative crystallizer vessel. These deposits can interfere with the evaporative crystallizer equipment by partially or fully plugging pumps, transfer lines, and/or heat exchangers, thus requiring that the system frequently be shut down for cleaning A typical design for a forced circulation evaporative crystallizer includes an outlet flow leaving the evaporative crystallizer at the bottom of the vessel and an inlet on the side of the vessel. Because fouling deposits accumulate at the bottom of the vessel, these deposits exit through the outlet and enter a circulation loop, thus partially or fully plugging the pumps, transfer lines, and/or heat exchangers in that loop. Thus, a need exists for a forced circulation evaporative crystallization system which allows for the accumulation of fouling deposits in order to avoid clogging of the circulation loop.

BRIEF SUMMARY

In one aspect, an illustrative embodiment provides an apparatus comprising an evaporative crystallizer, wherein the evaporative crystallizer includes a deposit accumulation volume located at the bottom of the evaporative crystallizer. The apparatus further comprises a first inlet for supplying a first flow to the evaporative crystallizer; and an outlet, wherein the outlet is located above the deposit accumulation volume and wherein the first inlet comprises a particle exit positioned above the outlet.

In another aspect, an illustrative embodiment provides a process comprises providing a feedstock of a solvent and a solute to a recirculation loop and heating the feedstock with a heat exchanger to provide a heated feedstock. The process further comprises supplying the heated feedstock to an evaporative crystallizer through a first inlet to produce a slurry, wherein the evaporative crystallizer includes a deposit accumulation volume; and returning the slurry to the recirculation loop through an outlet.

In another aspect, an illustrative embodiment provides a process comprises providing a feedstock of a solvent and a solute to a recirculation loop; heating the feedstock with a heat exchanger to provide a heated feedstock; and supplying the heated feedstock to an evaporative crystallizer through a first inlet to produce a slurry, wherein the evaporative crystallizer includes a deposit accumulation volume, and wherein fouling deposits accumulate in the deposit accumulation volume. The process further comprises returning the slurry to the recirculation loop through an outlet; extracting a portion of the slurry from the recirculation loop; supplying a first portion of the extracted slurry to the evaporative crystallizer through a second inlet, wherein the first portion of the extracted slurry sweeps crystalline product away from the deposit accumulation volume; and recovering crystalline product in a recovery system.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In one aspect, an apparatus for producing a crystalline product through evaporative crystallization is provided. The apparatus may be structured to reduce the build-up of fouling deposits and may prolong the operational time of an evaporative crystallizer between cleanings.

Figure 1:
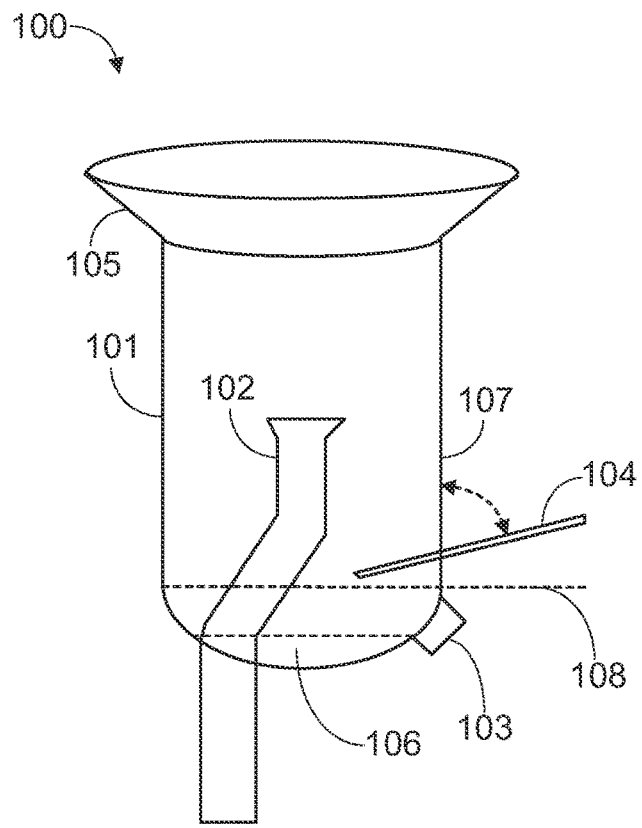
FIG. 1 is a schematic diagram of an apparatus for evaporative crystallization.

FIG. 1 illustrates an apparatus 100 for evaporative crystallization. The apparatus 100 may include a lower evaporative crystallizer section 101, a first inlet 102, an outlet 103, a second inlet 104, and a cone portion 105 allowing for the formation of a liquid-vapor interface. The first inlet 102 may enter the lower evaporative crystallizer section 101 at a position offset from the center or lowest point of the lower evaporative crystallizer section 101, which may allow for complete drainage from the lower evaporative crystallizer section 101. The first inlet 102 may comprise a particle exit positioned above the outlet 103. The outlet 103 may be positioned above the lowest point of the lower evaporative crystallizer section 101, thus forming a deposit accumulation volume 106. Fouling deposits from the crystallization process may accumulate in the deposit accumulation volume 106. For example, fouling deposits may form at the liquid-vapor interface and may fall to the deposit accumulation volume 106. Collecting these deposits may prevent such deposits from clogging a recirculation line. The deposit accumulation volume 106 may have a volume of between about 1 and about 50 percent of the volume of the lower evaporative crystallizer section 101, more preferably between 2 percent and 10 percent of the volume of the lower evaporative crystallizer section 101. For example, the lower evaporative crystallizer section 101 may have a volume of about 11 cubic meters (about 3000 gallons) and the deposit accumulation volume 106 may have a volume of about 1.9 cubic meters (about 500 gallons).

Figure 2:
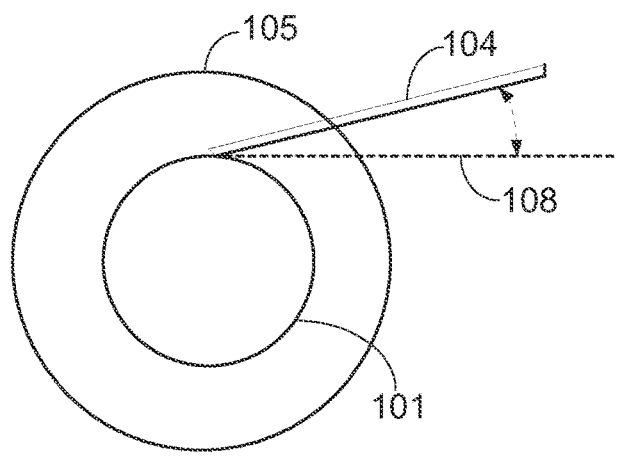
FIG. 2 is a top view of an apparatus for evaporative crystallization.

The lower evaporative crystallizer section 101 may have a substantially vertical sidewall 107. The second inlet 104 may be located at an angle of between about 45 degrees and about 90 degrees from the substantially vertical sidewall 107. FIG. 2 shows a top view of apparatus 100. The second inlet 104 may enter tangentially to or perpendicular to the substantially vertical sidewall 107, preferably in the lower quartile range of the vessel or more preferably from about 10 degrees to about 50 degrees from a tangent line 108. The second inlet 104 may provide a secondary flow that may sweep crystalline product particles away from the deposit accumulation volume 106 without sweeping the large fouling deposits out of the deposit accumulation volume 106. The secondary flow may also be used for providing solvent to clean the evaporative crystallizer at the end of a product run. The secondary flow may be between about 0.1 percent and about 20 percent of the flow through the first inlet 102, more preferably between about 0.5 percent and about 5 percent of the flow through the first inlet 102. For example, the flow through the first inlet 102 may be about 15 cubic meters per minute (about 4000 gallons per minute) and the secondary flow may be about 0.15 cubic meters per minutes (about 40 gallons per minute).

Figure 3:
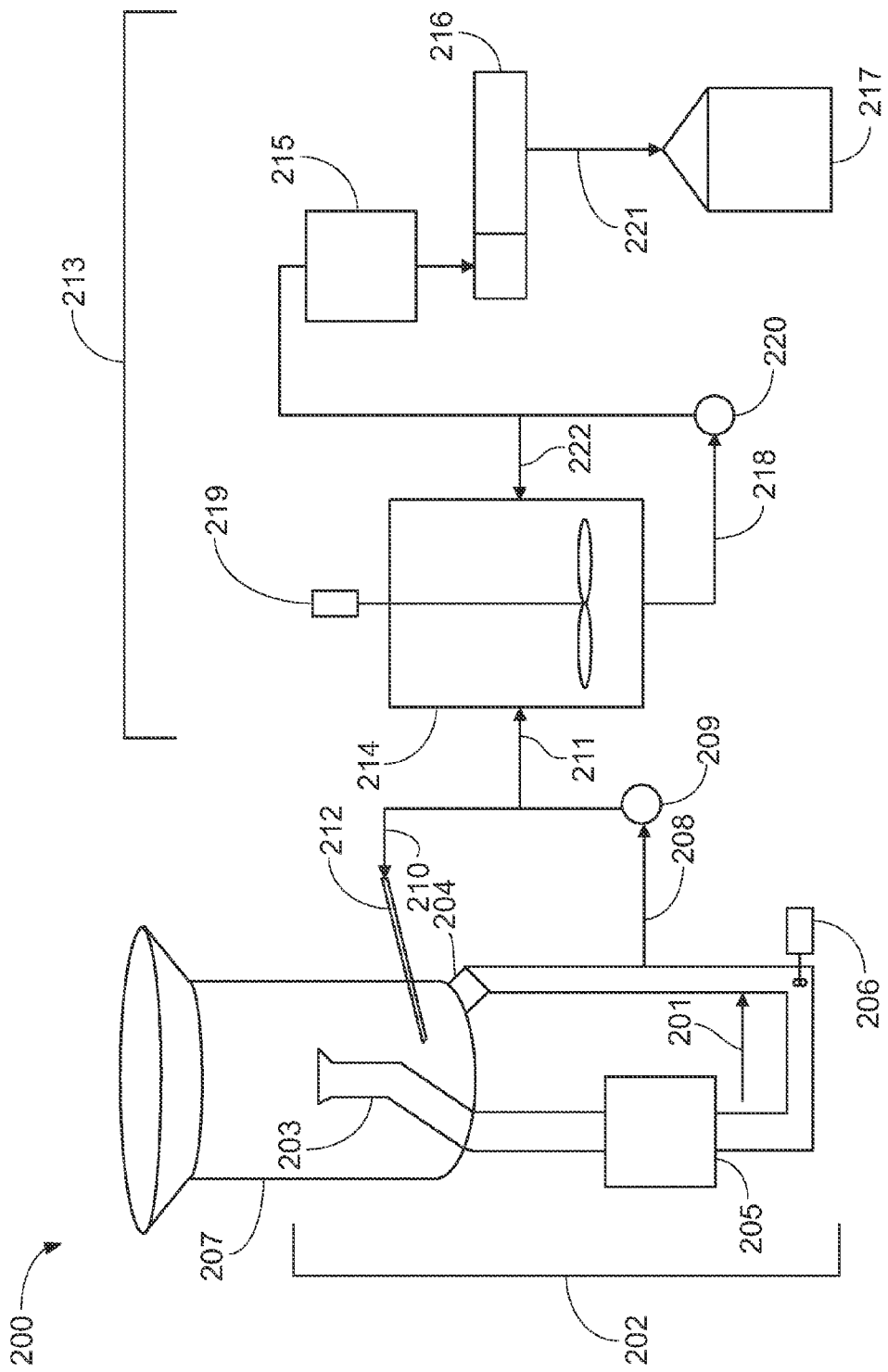
FIG. 3 is a schematic diagram of an apparatus for producing a crystalline product.

FIG. 3 illustrates an apparatus 200 for producing a crystalline product. A feedstock 201 is provided to a recirculation system 202. The feedstock 201 may comprise a solvent and a solute. The solvent may be, for example, water. The solute may be, for example, tetrasodium EDTA or disodium EDTA. Other commonly known solvents and solutes may also be used. The recirculation system 202 may include a first inlet 203, an outlet 204, a heat exchanger 205, and a recirculation pump 206. Shell and tube, plate, finned, and other types of well-known heat exchangers may be used; such as, for example, the shell and tube type of heat exchanger with the process fluid residing within the tubes of the heat exchanger. The feedstock 201 may enter the recirculation system 202, where the recirculation pump 206 may pump the feedstock 201, plus recirculating fluid entering the circulation loop at crystallizer outlet 204, to the heat exchanger 205. The heat exchanger 205 may heat the recirculating fluid 201 above the solvent boiling point. Generally the recirculating fluid is heated to achieve a temperature rise of between 0.1° C. to 10° C. above the solvent boiling point, more preferably between 1° C. to 2° C. above the solvent boiling point at the vapor liquid interface. The heated feedstock 201 may then enter an evaporative crystallizer 207 through the first inlet 203. The first inlet 203 may be offset from the center of the evaporative crystallizer 207 in order to allow for complete drainage from the evaporative crystallizer 207. The feedstock 201 may form a slurry in the evaporative crystallizer 207 as a portion of the feedstock 201 plus recirculating fluid evaporates to form vapor, causing a portion of the solute content to precipitate out of solution in the form of solid particles. The slurry may exit the evaporative crystallizer 207 into the recirculation system 202 through the outlet 204.

A portion of the slurry may be extracted from the recirculation system 202 as extracted slurry 208. This extraction may occur before the feedstock 201. Alternatively, this extraction may occur at another point of the recirculation system 202, or, alternatively, a nozzle may be added to the crystallizer 207 in such a location as to allow the removal of a portion of the slurry contents. The non-extracted portion of the slurry may flow back to the recirculation pump 206, the heat exchanger 205, and return to the evaporative crystallizer 207. The extracted slurry 208 may enter a first pump 209. After the first pump 209, the extracted slurry 208 may be divided into a first portion 210 and a second portion 211. The first portion 210 may be supplied to the evaporative crystallizer 207 through a second inlet 212. The first portion 210 may be introduced into the crystallizer at a direction sufficient to sweep crystalline product away from the deposit accumulation volume. The second portion 211 may be supplied to a recovery system 213 in order to recover a crystalline product. The second portion 211 may be about 10 percent of the flow of the first portion 210. For example, the first portion 210 may have a flow rate of 0.15 cubic meters per minute (40 gallons per minute) and the second portion 210 may have a flow rate of 0.015 cubic meters per minute (4 gallons per minute). The recovery system 213 may comprise a cooling crystallizer 214, a centrifuge 215, a drier 216, and a packaging apparatus 217. The second portion 211 may be supplied to the cooling crystallizer 214 to produce cooled crystalline slurry 218. The cooling crystallizer 214 may include a stirrer 219. The cooling crystallizer 214 may cool the second portion 211 to decrease the solubility of the crystalline product in the solvent. The cooled crystalline slurry 218 may be supplied to a second pump 220, then to the centrifuge 215, and then to the drier 216 in order to produce a crystalline product 221. The crystalline product 221 may then be sent to a packaging apparatus 217. A portion of stream 218 can be returned to the cooling crystallizer 214 via stream 222.

EXAMPLES

An evaporative crystallizer with an about 11 cubic meter operating volume (about 3000 gallons) that has a deposit inventory volume of approximately 0.28 cubic meters, or about 2.5 percent of the total working inventory is used. Steam is used to evaporate water from an approximate 40 percent solution of Na4EDTA to form Na4EDTA tetrahydrate crystals. The evaporative crystallizer includes a primary recycle with heating flowing at approximately 12.5 cubic meters per minute (about 3300 gallons per minute) and secondary tangential entry recycle that operates at approximately 0.28 cubic meters per minute (about 75 gallons per minute). The process is fed at a rate of approximately 2700 kg per hour (about 6000 pounds per hour) with an estimated 30 percent boil off rate.

Figure 4:
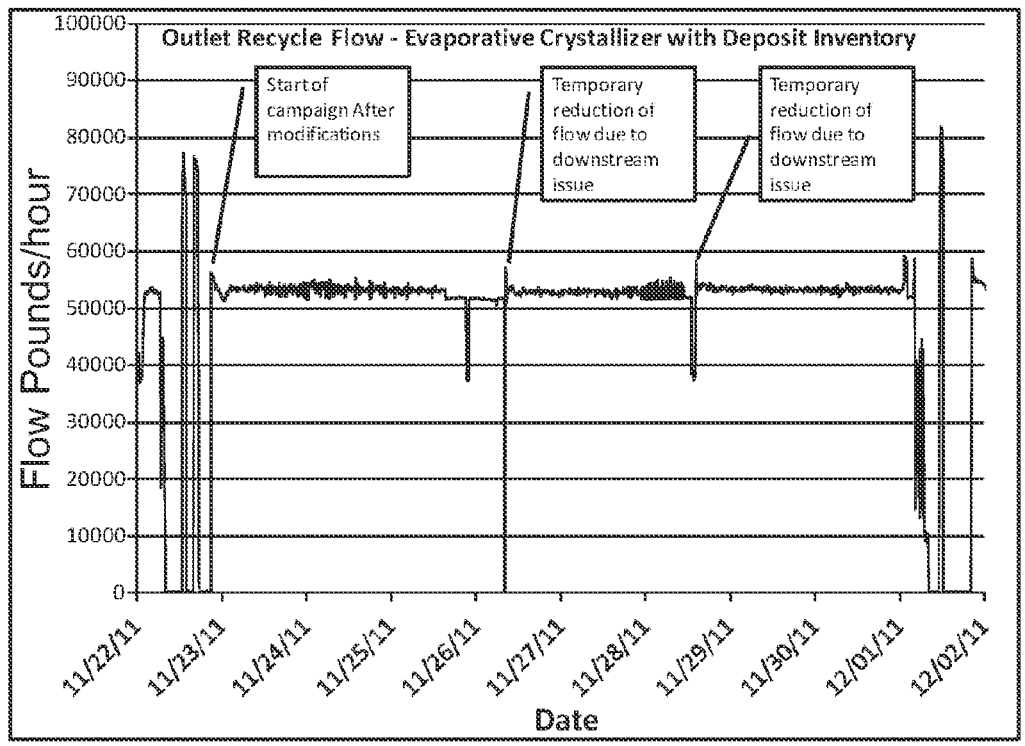
FIG. 4 is a graph showing the outlet flow over time for an apparatus for evaporative crystallization with a deposit accumulation volume.
Figure 5:
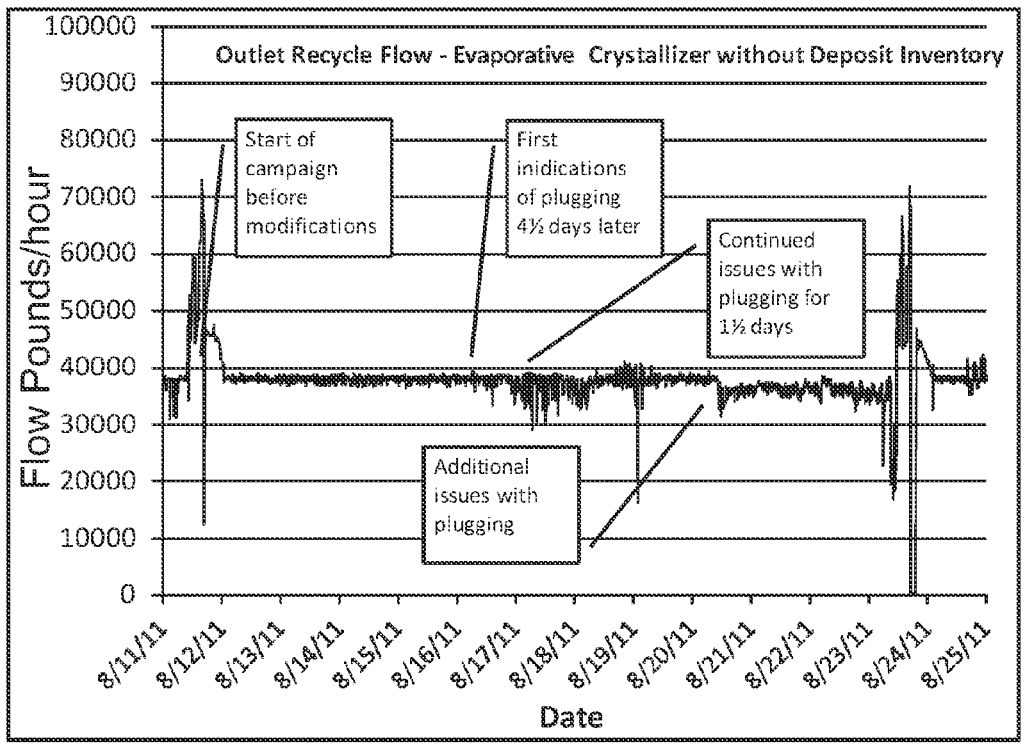
FIG. 5 is a graph showing the outlet flow over time for an apparatus for evaporative crystallization without a deposit accumulation volume.
Figure 7:
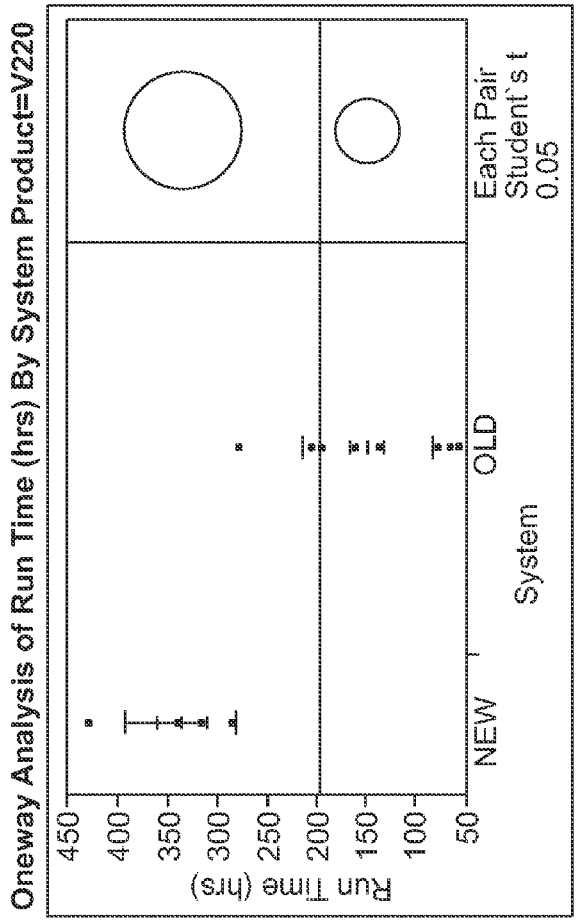
FIG. 7 is a graph showing analysis of run time by system product.

The evaporative crystallizer operates continuously for nine days without plugging of the evaporative crystallizer primary or secondary recycle flows or the evaporator heat exchanger located in the primary flow recycle loop (as shown in FIG. 4). This compares to 4-5 days operation for comparable systems using agitation for mixing, internal coils for heat transfer, no equivalent primary flow, and a secondary recycle flow of approximately 0.21 cubic meters per minute (about 55 gallons per minute) (as shown in FIG. 5). The operational run time between required system washes for the system using the primary flow recycle loop is 338 hours. This compares to 150 hours of operational run time between required system washes for the system using agitation for mixing (as shown in FIG. 7). Table 1 below shows the calculations used in FIG. 7.

TABLE 1

Calculations used for analysis of run time (as shown in FIG. 7)

Means and Std Deviations

| Level | Number | Mean | Std Dev | Std Err Mean | Lower 95% | Upper 95% |
|---|---|---|---|---|---|---|
| New | 5 | 338.000 | 55.5608 | 24.848 | 269.01 | 406.99 |
| Old | 15 | 150.133 | 65.0482 | 16.795 | 114.11 | 186.16 |

Means Comparisons
Comparisons for each pair using Student's t

| t | Alpha |
|---|---|
| 2.10092 | 0.05 |

| Abs(Dif)-LSD | New | Old |
|---|---|---|
| New | −83.79 | 119.45 |
| Old | 119.45 | −48.38 |

Positive values show pairs of means that are significantly different.

Figure 6:
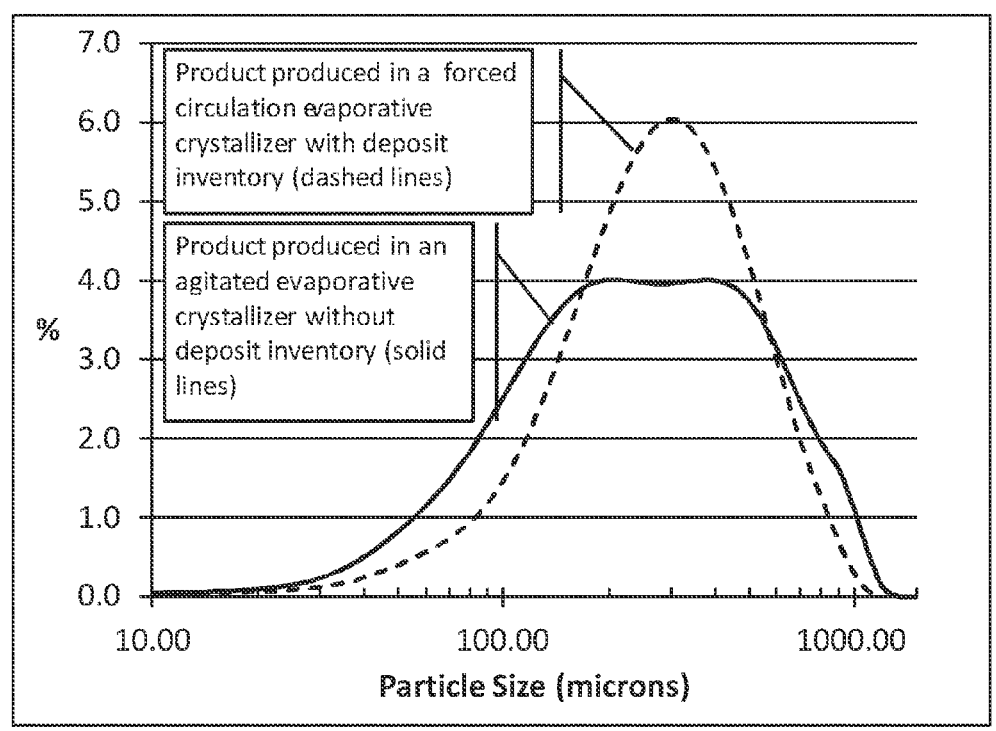
FIG. 6 is a graph showing the number of particles at various sizes for an apparatus for evaporative crystallization with a deposit accumulation volume and for an apparatus for evaporative crystallization without a deposit accumulation volume.

Impact on particle size distribution is also improved by decreasing the amount of small particles being generated. Particles sizes that are too small may create a particle dust, whereas particle sizes that are too large will not easily dissolve. A comparison of the number of particles at various sizes for a forced circulation system with a deposit accumulation volume (inventory) and for an agitated evaporative crystallizer utilizing internal heating coils is shown in FIG. 6.

While the invention has been described above according to its preferred embodiments, it can be modified within the spirit and scope of this disclosure. This application is therefore intended to cover any variations, uses, or adaptations of the invention using the general principles disclosed herein. Further, the application is intended to cover such departures from the present disclosure as come within the known or customary practice in the art to which this invention pertains and which fall within the limits of the following claims.

What is claimed is:

1. An apparatus comprising:
  an evaporative crystallizer, wherein the evaporative crystallizer includes a deposit accumulation volume located at the bottom of the evaporative crystallizer;
  a recirculation system including:
    a first inlet for supplying a first flow of a feedstock comprising a solvent and a solute to the evaporative crystallizer to produce a slurry;
    an outlet for supplying the slurry from the evaporative crystallizer to the recirculation system;
    a heat exchanger; and
    a recirculation pump;
  a second inlet for supplying a portion of the slurry to the evaporative crystallizer; and
  means for extracting the portion of the slurry from the recirculation system and introducing it into the evaporative crystallizer through the second inlet,
  wherein the evaporative crystallizer has a substantially vertical sidewall;
  wherein the outlet is located above the deposit accumulation volume;
  wherein the first inlet enters the evaporative crystallizer at a position offset from the lowest point of the evaporative crystallizer and comprises a particle exit positioned above the outlet; and
  wherein the second inlet is located above the deposit accumulation volume and oriented at an angle of less than 85 degrees from the substantially vertical sidewall.

2. The apparatus of claim 1, wherein the second inlet is of a diameter sufficient to permit a flow of between about 0.1 percent and about 20 percent of the flow permitted by the first inlet.

3. The apparatus of claim 1, wherein the evaporative crystallizer includes a cone portion allowing the formation of a liquid-vapor interface.

4. The apparatus of claim 1, further comprising a recovery system for recovering a crystalline product from a second portion of the slurry.

5. The apparatus of claim 1, wherein the deposit accumulation volume has a volume of between about 2 percent and about 50 percent of the volume of the evaporative crystallizer.

6. A process comprising:
  providing a feedstock comprising a solvent and a solute to a recirculation system including a first inlet; an outlet; a heat exchanger; and a recirculation pump;
  heating the feedstock with the heat exchanger to provide a heated feedstock;
  supplying the heated feedstock to an evaporative crystallizer through the first inlet to produce a slurry, wherein the evaporative crystallizer includes a deposit accumulation volume, wherein the evaporative crystallizer has a substantially vertical sidewall, wherein the outlet is located above the deposit accumulation volume, and wherein the first inlet enters the evaporative crystallizer at a position offset from the lowest point of the evaporative crystallizer and comprises a particle exit positioned above the outlet;
  returning the slurry to the recirculation system through the outlet;
  extracting a portion of the slurry from the recirculation loop; and
  supplying a first portion of the extracted slurry to the evaporative crystallizer through a second inlet, wherein the second inlet is located above the deposit accumulation volume and oriented at an angle of less than 85 degrees from the substantially vertical sidewall.

7. The process claim 6, further comprising accumulating fouling deposits in the deposit accumulation volume.

8. The process of claim 6, wherein the first portion of the extracted slurry is introduced into the crystallizer at a direction sufficient to sweep crystalline product away from the deposit accumulation volume.

9. The process of claim 6, further comprising supplying a second portion of the extracted slurry to a cooling crystallizer for cooling the second portion of the extracted slurry.

10. The process of claim 9, further comprising recovering crystalline product.

11. A process comprising:
  providing a feedstock comprising a solvent and a solute to a recirculation system including a first inlet; an outlet; a heat exchanger; and a recirculation pump;
  heating the feedstock with the heat exchanger to provide a heated feedstock;
  supplying the heated feedstock to evaporative crystallizer through the first inlet to produce a slurry, wherein the evaporative crystallizer includes a deposit accumulation volume, and wherein fouling deposits accumulate in the deposit accumulation volume, wherein the evaporative crystallizer has a substantially vertical sidewall, wherein the outlet is located above the deposit accumulation volume, and wherein the first inlet enters the evaporative crystallizer at a position offset from the lowest point of the evaporative crystallizer and comprises a particle exit positioned above the outlet;

returning the slurry to the recirculation system through the outlet;

extracting a portion of the slurry from the recirculation loop;

supplying a first portion of the extracted slurry to the evaporative crystallizer through a second inlet, wherein the second inlet is located above the deposit accumulation volume and oriented at an angle of less than 85 degrees from the substantially vertical sidewall, and wherein the first portion of the extracted slurry sweeps crystalline product away from the deposit accumulation volume; and recovering crystalline product in a recovery system.

* * * * *